United States Patent [19]
Gijsbert

[11] Patent Number: 5,922,119
[45] Date of Patent: Jul. 13, 1999

[54] USE OF AQUEOUS PROTECTIVE COATING COMPOSITIONS FOR INDUSTRIAL COATINGS AND AQUEOUS COATING COMPOSITIONS

[75] Inventor: Kroon Gijsbert, Hardinxveld Giessendam, Netherlands

[73] Assignee: Hercules Incorporated, Wilmington, Del.

[21] Appl. No.: 09/049,536

[22] Filed: Mar. 27, 1998

[30] Foreign Application Priority Data

Mar. 27, 1997 [EP] European Pat. Off. .............. 97105214

[51] Int. Cl.$^6$ .............................. C09D 5/08; C09D 7/06; C09D 7/00
[52] U.S. Cl. ................... 106/162.1; 106/163.01; 106/172.1; 106/205.01; 106/206.1; 524/43; 524/44; 524/45; 524/46; 524/50; 524/55; 524/503; 524/516; 524/531
[58] Field of Search ........................... 106/162.1, 163.01, 106/172.1, 250.01, 206.1; 524/43, 44, 45, 46, 50, 55, 503, 516, 531

[56] References Cited

U.S. PATENT DOCUMENTS 4,575,530  3/1986  Peiffer et al. ............................ 524/548

FOREIGN PATENT DOCUMENTS

0867481 A1  9/1998  European Pat. Off. .......... C09D 7/00

*Primary Examiner*—David Brunsman
*Attorney, Agent, or Firm*—David Edwards

[57] ABSTRACT

The invention is directed to the use of an aqueous protective coating composition containing a binder system and an associative thickener for industrial coatings. The associative thickener is not a polyurethane thickener and is selected so that its concentration required by the specific application method is below the critical concentration C*, defined as the thickener concentration at which the coils of the thickener polymer start to overlap of entangle calculated according to the Mark Houwink equation.

22 Claims, No Drawings

USE OF AQUEOUS PROTECTIVE COATING COMPOSITIONS FOR INDUSTRIAL COATINGS AND AQUEOUS COATING COMPOSITIONS

The invention relates to the use of specific aqueous protective coating compositions containing an associative thickener for industrial coatings and to some specific aqueous protective coating compositions.

Associative thickeners and aqueous coating compositions containing such associative thickeners are well known in the prior art. In this respect, it can be referred to a number of documents e.g. EP-A 566 911, EP-A 339 712, EP-A 138 614, EP-A 426 086, EP-A 465 992, EP-A 471 866, CA-20 23 058, DE-A 30 04 161, EP-A 376 196, EP-A 384 167, U.S. Pat. No. 4,902,733, EP-A 444 791, DE-A 42 24 617, EP-A 396 576, WO 94/06840 and EP-A 350 414. However, while most of these documents refer to the industrial applicability of the disclosed protective coatings, this "industrial applicability" is restricted to applying the coatings by rollers or brushes mainly in the architectural field for buildings and indoor uses etc. Contrary thereto, the term "industrial coatings" as used herein refers to coatings which are applied by industrial methods as defined below.

It is extensively discussed in the prior art, e.g. in WO 94/06840, that traditional thickeners such as cellulose derivatives and polyacrylate provide insufficient levelling in water based paints. So, it was believed that many of the water soluble polymers like carbohydrates and synthetic associative thickeners disclosed in the prior art cannot be practically used for the application of water based paints by industrial methods such as spraying techniques like conventional air spray, high volume low pressure techniques and airless spray techniques. By applying the prior art coatings by such industrial methods, many associative thickeners have a negative influence on sprayability, film formation of the binder, smoothness of the coating film, water resistance and film gloss, which do not occur when applying these coatings by brushes, rollers etc.

Application by industrial methods becomes even more problematic due to the development of new binder systems with very fine particle sizes of less than about 200 nm down to about 50 nm.

The prior art tried to overcome this problem by the development of polyurethane thickeners as described e.g. in WO 94/06840 and in practice all known aqueous protective coating compositions comprising binder systems with very small particle sizes (which are used for application by industrial methods) are based on polyurethane type thickeners.

Therefore, there is a problem in the prior art that, with the exception of polyurethane type thickeners, there is no reliable way of providing aqueous coating compositions which can be used for the application by industrial methods. Prior to the present invention, it was believed that an aqueous protective coating composition containing conventional thickeners cannot provide satisfactory results when applied by industrial methods such as conventional air spray techniques, high volume low pressure techniques and airless spray techniques, even if this composition showed good results when applied by brushes or rollers.

Unexpectedly, it was found in the present invention that this problem can be solved by using an aqueous protective coating composition for application by industrial methods containing a binder system and an associative thickener, which is characterized in that the associative thickener is not a polyurethane thickener and is selected so that its concentration required by the specific application method (e.g. required to spray viscosity) is below the critical concentration C*, defined as the thickener concentration at which the coils of the thickener polymers start to overlap or entangle, calculated according to the Mark Houwink equation $$C^* = \frac{2.5}{[\eta]}$$

$$\Phi * \langle h^2 \rangle_h^{3/2} = [\eta] * M_v = K * M_v^{\alpha+1}$$

$$R_G = \left(\frac{\langle h^2 \rangle_h}{6}\right)^{1/2}$$

wherein

[$\eta$] is the limiting viscosity number $\Phi$ and K are proportionality constants $\langle h^2 \rangle$h is the hydrodynamic equivalent mean square end to end distance of the polymer molecule $M_v$ is the viscosity average molecular weight of the thickener $\alpha$ is a constant and $R_G$ is the radius of gyration.

The present invention furthermore provides aqueous protective coating compositions having a viscosity which allows its application by industrial methods containing an associative thickener and a binder system, wherein the binder system has a particle size of 50 to 200 nm and in which the associative thickener is not a polyurethane thickener and is present in a concentration below C* as defined above.

In order to use an aqueous coating composition for application by industrial methods, it is necessary that its viscosity is adjusted to meet the requirements of the application apparatus, e.g. the spray gun used. For different spray techniques different viscosities are required. For high volume low pressure techniques the required viscosity is in the order of 40 sec. DIN 4, for airless spray techniques much higher viscosities are required. For airless spraying the paint generally has a viscosity in the range of 2000 to 10000 mPas, such as a Brookfield viscosity of 3000 to 4500 mPas, 8000 to 9000 mPas or a Stormer viscosity of about 95 Krebs Units. Which viscosities are required for which techniques and how the viscosities can be determined is explicitly discussed in Ernest W. Flick "Water-based Paint Formulations Vol. 3", Noyes Publications, Park Ridge, N.J., USA, 1994. It can additionally be referred to the publicly available product literature of the manufaturers of application apparatus, such as the product literature on spray guns by ECCO or of companies such as Zeneca Resins, Waalwik, The Netherlands, which published the required viscosity for industrially applicable paints, e.g. in a product leaflet concerning the formulation JY137. How the viscosity of a paint formulation is measured is additionally within the general technical knowledge of a skilled person.

According to the present invention, an aqueous protective coating composition can be used for application by industrial methods, if the concentration of the thickener is below C* and preferably below $C^*_p=C^*/2.5=1/[\eta]$. Therefore, a thickener has to be selected which at a concentration in the aqueous protective coating composition which is below C*, preferably below $C^*_p$, nevertheless provides the viscosity as required by the specific application method. How a specific thickener can be manipulated to provide a higher viscosity at lower concentrations is principally known to a skilled person and explained in some detail below.

It was unexpectedly found that by using compositions as defined above for industrial coatings, the binder particles do not flocculate and that such compositions will provide industrial coatings with high gloss, good flow, good sprayability, water resistance, corrosion resistance and blistering resistance. Such compositions can preferably be used as coatings for protection of transport vehicles referred to as Transport Original Equipment Manufacturing (OEM), car refinish, general industrial coatings, anti corrosion coatings, maintenance coatings and wood coatings. The substrates can be metal, wood and plastic. The coating can be a primer, intermediate coat or top coat. The coatings are applied to the substrates in a wide variety of known application techniques. Among these are spraying techniques like conventional air spray, HVLP (high volume low pressure) and airless spray. The binder systems used as a basis for the waterborne coatings vary between binder dispersions, emulsions and two pack systems. Chemically they can be, among others, acrylic, modified acrylic, alkyd based, urethanes, urethane-acrylics, epoxies, epoxy esters etc. Latex paints are particularly preferred.

According to the present invention, the thickeners do not need to be selected by their chemistry, only by the particle size and weight fractions of binder and/or pigment and water. In the following, it is described how for a given coating system comprising a latex (dispersion of solid binder particles in water) the maximum concentration of the associative thickener can be calculated. Since the particle size of the binder and pigment as well as the composition of the (simplified) coating systems are known, one can easily calculate the average layer thickness of water that is surrounding the dispersed components (binder, pigment). In these calculations, the pigment and binder particles are usually assumed to be spherical. How such a calculation can be done is well known to a skilled person and particularly explained for a specific example below. According to the invention, it was unexpectedly found that the thickener molecule will not flocculate the binder or pigment particles if the hydrodynamic diameter of the coil of the water soluble polymer (=thickener/rheology modifier) does not exceed the diameter of the layer thickness of the continuous phase.

The hydrodynamic volume ($V_h$) of a thickener coil in solution is defined to be the mean square root of the radius of gyration ($<R_G^2>$) to the power of 3/2.

For determining the optimum composition and concentration of the associative thickener, we need to know the so called Mark Houwink equation for the basic polymers used to make the associative thickener. The Mark Houwink equation as well as the relationship between the radius of gyration, the hydrodynamic equivalent mean square end to end distance of the polymer molecule and the viscosity average molecular weight are disclosed in various standard text books e.g. in D. W. van Krevelen, Properties of Polymers, Elsevier Scientific Publishing Company, Amsterdam-Oxford-New York, 1976, H. Elias, Macromolecules 1 & 2, John Wiley & Sons, S. Sun, Physical Chemistry of Macromolecules, John Wiley & Sons or Polymer Handbook. In the prior art, the Mark Houwink equation is generally used to determine the viscosity averaged molecular weight of a polymer from the (measured) limiting viscosity number. It is assumed that the Mark Houwink equation does not change dramatically due to the modification of the basic polymer with hydrophobic groups, as is disclosed e.g. in Robert A. Gelman and Howard G. Barth, "Viscosity Studies of Hydrophobically Modified (Hydroxyethyl) Cellulose" in ACS Conference book on Water Soluble Polymers, 1986, Chapter 6, pages 101 to 110.

The hydrophobic groups usually represent less than 5 wt % of the total thickener and it can be assumed that the coil volume of the non-modified and modified polymer are similar.

From the following equations $$C^* = \frac{2.5}{[\eta]}$$

$$\Phi * \langle h^2 \rangle_h^{3/2} = [\eta] * M_v = K * M_v^{\alpha+1}$$

$$R_G = \left( \frac{\langle h^2 \rangle_h}{6} \right)^{1/2}$$

which are disclosed e.g. in the above reference books, for a given associative thickener polymer the maximum possible viscosity average molecular weight can be determined by using the maximum value of the radius of gyration calculated as discussed above. Values of $\Phi$, $K$ and $\alpha$ for various polymers are disclosed e.g. in the Polymer Handbook for synthetic polymers and in R. Lapasin and S. Pricl, Rheology of Industrial Polysacharides—Theory and Applications, Blackie Academic & Professional, Chapman and Hall for carbohydrate based polymers. Other standard books disclosing these constants are known to a skilled person.

Knowing the viscosity average molecular weight, the limiting viscosity number $[\eta]$ can be calculated and, thus, the reciprocal value of the limiting viscosity number is correlated to the thickener concentration at which the coils start to overlap or entangle. By selecting the thickener concentration in the continuous phase below this critical concentration, it is ensured that the continuous phase will behave as a liquid while elastic properties will start to show up beyond this critical polymer concentration. Therefore, the use level of the thickener molecule should remain below this level to make sure that the system will flow well.

The associative thickeners which can be used according to the invention can be carbohydrate based thickeners (natural thickeners) or synthetic thickeners. Preferred are the carbohydrate based thickeners such as modified cellulose ethers. Preferred are associative thickeners comprising as a basic polymer hydroxyethyl cellulose, hydroxypropyl cellulose, methyl cellulose, polyethyleneoxide, ethylhydroxylethyl cellulose, carboxymethyl cellulose, guar gum, starch, starch ethers, particularly hydroxyethyl starch, locust bean gum, pectin, xanthan gum, methylhydroxyethyl cellulose, polyvinylpyrolidone, polyvinyl alcohol, methylhydroxypropyl cellulose, mixed ethers of the above cellulose derivatives and mixtures thereof. Especially preferred are hydrophobically modified hydroxyethyl cellulose, hydrophobically modified methylhydroxyethyl cellulose, hydrophobically modified hydroxypropyl cellulose, hydrophobically modified polyethyleneglycols, particularly hydrophobe endcapped polyethyleneglycols. Preferred are dodecyl- and cetyl-modified polymers, e.g. polyethyleneoxides. Preferred thickeners are disclosed e.g. in EP-A 566 911 and U.S. Pat. No. 5 574 127. Furthermore, starch and its derivatives are associative thickeners which can advantageously be used according to the invention.

The present invention is particularly useful for coating compositions comprising new binder systems with very fine particle sizes down to 50 nm, preferably between 200 nm and 50 nm. As is evident from the calculations shown below, the critical concentration for compositions having large particles of well above 200 nm is quite high and, thus, such compositions are not so likely to flocculate when applied by industrial methods. Particularly preferred are coating compositions with very fine particle sizes of below 100 nm and those having particle sizes of about 50 nm or above. The particle size of the latexes referred to in this specification is as measured by a Disk Centrifuge of the type Joyce Loebl.

In the following, the invention will be explained in some detail for two typical coating compositions. The invention is not restricted thereto.

As typical coating system 1 a latex can be mentioned with an average particle size of 50 nm and a solids content of 50 wt %. A further typical coating system is system 2 which is a coating system represented by 60 wt % latex (200 nm particle size), 20% pigment (1000 nm particle size) and 20% additional water. The latex has a solids content of 50% w/w, which makes as a solids content of the paint 50 wt % as in the system 1 defined above.

The layer thickness of water around the binder particles can then be calculated for system 1 to be 10 nm and for system 2 to be 60 nm. The calculation of the layer thickness for system 1 is now explained in detail. However, how such a calculation can be done is well within the knowledge of a skilled person.

In system 1 there is a solids content of 50% and the particle size is 50 nm. Per 100 g of the coating therefore 0.050 kg of solid latex paricles are present. The specific gravity of the latex particles is known and for the purpose of this calculation it can be assumed to be $\rho=1100$ kg/m$^3$. Since the particles are assumed to be spherical, each particle has a volume of $V=(4/3)\pi R^3$. The surface area of each latex particle is $O=4\pi R^2$. The weight of the particle is $\rho V$. The number of particles thus follows from the total weight of the solid latex particles and the weight of one particle and is $N=0.050/(\rho V)$. The total surface area of the latex particle calculates to (number of particles × surface area of one particle=N×O). 50 g of water which are present in the system equal 50 ml or $50\times 10^{-6}$ m$^3$. The layer thickness of the liquid on the latex particles can then be calculated to be $L=50\times 10^{-6}/(N\times O)$. Using the concrete numbers for system 1, it follows:

$$N=0.05/1100\times(4/3)\pi(25\times10^{-9})^3=6.945\times10^{17} \text{ particles,}$$

$$O=4\pi(25\times10^{-9})^2=7.854\times10^{-15}m^2$$

$\Rightarrow$ $L=9.17\times10^{-9}$m corresponding to approximately 10 nm as disclosed above.

Following the calculations as explained above, the layer thickness for any system can be easily calculated.

In order to make sure that the thickener molecule will not flocculate the binder or pigment particles, the hydrodynamic diameter of the coil of the water soluble polymer (=thickener/rheology modifier) should not exceed the diameter of the layer thickness of this continuous phase. Therefore, the radius of gyration of these thickener coils should not exceed 5 nm for system 1 and not exceed 30 nm for system 2. The hydrodynamic volume ($V_h$) of the corresponding thickener coils in solution can then be calculated for system 1 to be $V_h=1.25\times10^{-19}$cm$^3$ and for system 2 to be $V_h=2.76\times10^{-17}$cm$^3$.

Introducing the values for the radius of gyration into the Mark Houwink equation, the viscosity average molecular weight can be calculated and knowing the viscosity average molecular weight, the limiting viscosity number $[\eta]$ and the critical concentration range can be determined. In particular, by taking the reciprocal value of the limiting viscosity number, the thickener concentration can be determined at which the coils start to overlap or entangle. The Mark Houwink equation, the viscosity average molecular weight range calculated for systems 1 and 2 and the preferred critical concentration $C^*_p$ range calculated are summarized in the following table for a broad range of basic water soluble polymers.

| Basic Polymer | Mark Houwink equation $[\eta]$ in l/g | $M_v$ - range | $C^*_p$ range [wt %] ($C^*/2.5 = 1/[\eta]$) |
|---|---|---|---|
| Hydroxyethyl cellulose | $[\eta] = 12.55*100 -6*M00.81$ | 3100–60500 | 1.07–11.8 |
| Hydroxypropyl cellulose | $[\eta] = 0.41*100 -6*M01.06$ | 6100–83700 | 1.48–23.7 |
| Methyl cellulose | $[\eta] = 316*100 -6*M00.55$ | 1500–48000 | 0.84–5.67 |
| Polyethylene oxide | $[\eta] = 218.5*100 -6*M00.48$ | 2700–102300 | 1.80–10.3 |
| Ethylhydroxy ethylcellulose | $[\eta] = 37*100 -6*M00.80$ | 1800–36000 | 0.61–4.9 |
| Carboxymethyl cellulose | $[\eta] = 7.2*100 -6*M00.95$ | 2300–37000 | 0.63–8.9 |
| Guar gum | $[\eta] = 0.78*100 -6*M00.98$ | 6400–96000 | 1.69–24.0 |
| Hydroxyethyl starch | $[\eta] = 291*100 -6*M00.35$ | 4700–251000 | 4.4–17.8 |
| Locust Bean Gum | $[\eta] = 8.02*100 -6*M00.79$ | 4400–88000 | 1.55–16.5 |
| Pectin | $[\eta] = 21.6*100 -6*M00.79$ | 2500–51000 | 0.88–9.6 |
| Xanthan Gum | $[\eta] = 17*100 -6*M01.32$ | 450–4800 | 0.08–1.85 |
| Methylhydroxy ethylcellulose | $[\eta] = 1.47*100 -6*M00.70$ | 1200–30000 | 0.50–4.8 |
| Polyvinyl pyrolidone | $[\eta] = 67.6*100 -6*M00.55$ | 4000–129500 | 2.28–15.4 |
| Polyvinyl alcohol | $[\eta] = 140*100 -6*M00.60$ | 2000–57000 | 1.00–7.5 |

In order to make sure that the continuous phase containing the thickener molecules will behave as a viscous liquid, the thickener content should remain below the critical polymer concentration calculated. This means for example for hydrophobically modified hydroxyethylcellulose in the more critical system 1: below $C^*_p=1.07$ wt % and for the hydrophobically modified Xanthan Gum in the more forgiving system 2: below $C^*_p=1.85$ wt %.

The hydrophobe content and type of modification of the associative thickener can be adjusted as required to reduce the concentration of the associative thickener in the aqueous protective coating composition below $C^*$ or preferably $C^*_p$ while nevertheless the associative thickener provides a viscosity which is sufficiently high to meet the requirements of the envisaged industrial applicability, e.g. the viscosity which is required to meet the 40 sec. DIN Cup 4. The hydrophobe types suitable for this purpose are alkyl and alkyl aryl groups ranging from C8–C24 carbon atoms in the alkyl group. The hydrophobe modification can range from 0.4 wt % up to 5 wt % or until material becomes insoluble in water. The amount of hydrophobe needed depends on the strength of the interaction between the binder and the thickener and needs to be checked in the final coating system. In practice, the required range of hydrophobe contents is estimated to be between 0.5 wt % and 4.0 wt %. It is known that increasing the hydrophobe content yields an increased thickening efficiency, e.g. G. Kroon, "Associative Behaviour of Hydrophobically Modified Hydroxyethyl Cellulose (HMHEC's) in Waterborne Coatings" in Progress in Organic Coatings, 22, 1993, Elsevier Sequoia pages 245 to 260 or EP-A 566 911.

The following examples further describe the invention.

In the following examples, in table 2a the value of $C^*_p$ refers to a polymer solution, whereas in table 2b and in the further tables of the examples the concentrations indicated refer to the total paint which contains only a certain percentage of solids. If nothing else is stated, the solids content of the tested paints is 50%. Therefore, to decide whether or not any of the disclosed compositions falls within the scope of the present invention, the concentration has to be adapted to a polymer solution. For example, the concentrations given in table 2b (50% solids content) have to be multiplied by 2 and then compared to the value of $C^*_p$ indicated in table 2a. A corresponding calculation has to be carried out with respect to the other tables.

The concentration of the associative thickeners in the tested aqueous protective coating compositions was adjusted to meet the viscosity according to 40 sec. DIN 4 as discussed in Ernest W. Flick, "Water-based Paint Formulations Vol. 3", Noyes Publications, Pack Ridge, N.J., USA, 1994. This viscosity of the coating compositions was necessary to apply the compositions with the spray guns used in the examples.

EXAMPLES

The first example shows the performance of a number of hydrophobically modified hydroxyethyl celluloses with variable molecular weight and hydrophobe type and -content in an anti-corrosion paint based on a styrene acrylic latex (formulation: see Table 1).

TABLE 1

Anti-corrosion primer formulation for air- and HVLP-spray application

|  | Parts by weight |
|---|---|
| Water | 83.4 |
| Thickener | variable to 40 sec. DIN Cup 4 |
| Styrene acrylic latex | 150.0 |
| Dispersant | 4.5 |
| Preservative | 3.5 |
| Co-solvent | 31.5 |
| Defoamer | 0.5 |
| $TiO_2$ | 100.0 |
| Calcium carbonate | 29.0 |
| Talc | 43.0 |
| Zincphosphate | 66.0 |
| Zincoxide | 29.0 |
| Styrene acrylic latex | 380.0 |
| Epoxyester solution | 73.5 |
| Defoamer | 0.3 |
| Ammonia (25%) to pH ~ 8.5 | 3.4 |
| Total | 1000.0 |

Solids content at spraying is 50 wt %. The particle size is approximately 100 nm (the exact value is 82 nm).

Example 1

The various HMHECs are described and their performances in the anti-corrosion primer are summarized in Table 2a and b:

TABLE 2a

Composition of some HMHECs to be evaluated in the anti-corrosion primer

|  | $M_v$ | Hydrophobe | HM-DS [wt %] | $C^*_p$ [wt %] |
|---|---|---|---|---|
| HMHEC 1 | 290000 | C16 | 1.5 | 0.30 |
| HMHEC 2 | 100000 | C16 | 1.5 | 0.71 |
| HMHEC 3 | 60000 | C16 | 1.5 | 1.07 |
| HMHEC 4 | 48000 | C16 | 1.5 | 1.29 |
| HMHEC 5 | 40000 | C16 | 1.5 | 1.49 |
| HMHEC 6 | 48000 | C16 | 0.3 | 1.29 |
| HMHEC 7 | 48000 | C12 | 3.1 | 1.29 |

TABLE 2a-continued

Composition of some HMHECs to be evaluated in the anti-corrosion primer

|  | $M_v$ | Hydrophobe | HM-DS [wt %] | $C^*_p$ [wt %] |
|---|---|---|---|---|
| HMHEC 8 | 48000 | NP | 2.3 | 1.29 |
| HMHEC 9 | 890000 | none | — | 0.12 |

NP: Nonylphenyl

TABLE 2b

Performance of various HMHECs in an anti-corrosion primer based on a styrene acrylic latex and an epoxyester emulsion.

|  | Conc. [wt %] for 40s DIN 4 | Spray-ability | Film appear. | 200 h salt spray resist. | Wet adhesion | Blistering |
|---|---|---|---|---|---|---|
| HMHEC 1 | 0.32 | poor | poor | 3 | 3 | none |
| HMHEC 2 | 0.42 | good | moderate | 5 | 3 | none |
| HMHEC 3 | 0.52 | good | smooth | 9 | 4 | none |
| HMHEC 4 | 0.62 | good | smooth | 9 | 4 | none |
| HMHEC 5 | 0.72 | good | smooth | 9 | 4 | none |
| HMHEC 6 | 1.04 | moderate | moderate | 3 | 3 | none |
| HMHEC 7 | 0.62 | good | smooth | 8 | 4 | none |
| HMHEC 8 | 0.63 | good | smooth | ND | 4 | none |
| HMHEC 9 | 0.21 | poor | poor | 3 | 4 | none |

It is obvious to conclude from the results in Table 2b that the HMHEC samples with a molecular weight within the $M_v$-range and present in the composition at thickener concentrations below $C^*_p$, as outlined above, can be applied by industrial methods, while compositions not having a thickener $M_v$ and concentration according to the invention cannot. In particular, in formulations 3, 4, 5, 7 and 8 the concentration of the thickener was below $C^*_p$ and the formulations could be applied by spraying giving excellent anti-corrosion primers, while in formulations 1, 2, 6 and 9 the concentration of the thickener was above $C^*_p$ and, therefore, either the sprayability of the formulation was only moderate or the resulting film showed shortcomings (please note, that the conc. [wt %] for 40 s DIN 4 in table 2b has to be multiplied by 2 to allow a comparison with $C^*_p$ in table 2a).

Example 2

In the same anti-corrosion primer of example 1 a hydrophobically modified methylhydroxethyl cellulose (HMMHEC 1) and a hydrophobically modified hydroxypropyl cellulose (HMHPC 1) were evaluated. The HMMHEC 1 sample has a molecular weight of 25000 and a dodecyl-substitution of 1.3 wt %. The HMHPC sample had a molecular weight of 66000 and a HP-MS of 2.5 and dodecyl-substitution of 1.9 wt %. The test results are summarized in Table 3. The products were compared with their non-modified precursors MHEC 1 and HPC 1 respectively.

TABLE 3

Evaluation of hydrophobically modified MHEC and HPC in an anti-corrosion primer (formulation: Table 1).

| | Conc. [wt %] for 40s DIN 4 | Spray-ability | Film appear. | 200 h salt spray resist. | Wet adhesion | Blistering |
|---|---|---|---|---|---|---|
| MHEC 1 | 0.94 | poor | poor | ND | 3 | none |
| HMMHEC 1 | 0.26 | good | good | ND | 4 | none |
| HPC 1 | 1.68 | poor | poor | ND | 2–3 | slight |
| HMHPC 1 | 0.87 | good | good | ND | 4 | none |

The sprayability of the coatings with the hydrophobically modified materials is good while the film appearance of these samples is good as well. This can be expected on the basis of method described before. The molecular weight of HMMHEC 1 and HMHPC 1 is within the range indicated, while the critical polymer concentration is not exceeded of these materials:

$C^*$ HMMHEC: 0.57 wt %
$C^*$ HMHPC: 1.90 wt %

Example 3

Example 1 and 2 were related to carbohydrate based associative thickeners and more specifically cellulose derivatives. Example 3 shows that the described selection method is also applicable to synthetic thickeners. Dodecyl- and cetyl-modified polyethyleneoxides with variable compositions were synthesized and evaluated in the anti-corrosion primer of Table 1.

The compositions of the hydrophobe end-capped polyethyleneglycols are given in Table 4, whereas the paint evaluation results are summarized in Table 5.

TABLE 4

Composition of hydrophobe end-capped PEG samples.

| | Hydrophobe | HM-DS [wt %] | $M_v$ | $C^*_p$ [wt %] |
|---|---|---|---|---|
| HMPEG 1 | C16 | 2.23 | 27000 | 3.4 |
| HMPEG 2 | C12 | 1.85 | 25000 | 3.5 |
| HMPEG 3 | C12 | 1.17 | 27000 | 3.4 |
| HMPEG 4 | C12 | 0.9 | 47000 | 2.6 |
| PEG 100000 | none | — | 100000 | 1.62 |

TABLE 5

Performance of hydrophobe end-capped PEGs in an anti-corrosion primer (formulation: see Table 1).

| | Conc. [wt %] for 40s DIN 4 | Spray-ability | Film appear. | 200 h salt spray resist. | Wet adhesion | Blis-Blistering |
|---|---|---|---|---|---|---|
| HMPEG 1 | 0.24 | good | smooth | 9 | 4 | none |
| HMPEG 2 | 0.58 | good | smooth | 8 | 3 | none |
| HMPEG 3 | 0.90 | good | smooth | 8 | 3 | none |
| HMPEG 4 | 0.46 | good | smooth | 8 | 3 | none |
| PEG 100000 | 3.8 | moderate | moderate | 1 | 1 | many |

The 3.8 wt % of PEG 100000 required to generate the 40 seconds DIN cup 4 exceeds the critical polymer concentration at the $M_v$ of 100000 ($C^*$=1.82 wt %). Therefore, sprayability and film appearance are poor. The tendency to flocculate the binder particles is illustrated by its poor water resistance and corrosion resistance.

Now it has been shown that the invention is both applicable to carbohydrate-based and synthetic associative thickeners. In order to demonstrate that the invention is also applicable to a wide variety of coating systems two associative thickeners are evaluated in other coating systems according to the invention. The products selected are HMHEC 4 and HMPEG 1. As representative of a product outside the desired composition range HMHEC 2 was selected as reference together with a commercial product Natrosol Plus grade 331 with indicative composition of hydroxyethyl cellulose with $M_v$~300000 and cetyl substitution of approximately 0.6 wt %.

Example 4

Example 4 shows the performance of the different rheology modifiers in a top coat based on a styrene acrylic latex. Table 6 exhibits the formulation of the top coat and table 7 summarizes the paint properties after spraying the coating on cold rolled bondar steel which was protected by an anti-corrosion primer based on the formulation of Table 1 using HMHEC 4 as a thickener.

TABLE 6

Formulation of a high gloss top coat based on a small particle size styrene acrylic latex (82 nm).

| | Parts by weight |
|---|---|
| Water | 31.5 |
| Styrene acrylic latex | 244.3 |
| Defoamer | 3.0 |
| Dispersant | 5.5 |
| Preservative | 1.0 |
| Thickener | variable to 40 s DIN 4 |
| Butylglycol | 34.3 |
| $TiO_2$ | 181.1 |
| Styrene acrylic latex | 489.8 |
| $NaNO_2$ (30%) | 4.0 |
| Total | 1000.0 |

The solids content of the formulation is 50 wt %.

TABLE 7

Performance of various thickeners in a top coat based on a styrene acrylic latex.

| | Conc. [wt %] for 40s | Spray-ability | Film appear. | Dry adhesion | Film gloss 60 [%] | wet adhesion | $C^*_p$ |
|---|---|---|---|---|---|---|---|
| Natrosol Plus 331 | 0.38 | poor | poor | 3 | 48 | 3 | 0.3 |
| HMHEC 2 | 0.59 | moderate | moderate | 4 | 54 | 3 | 0.71 |
| HMHEC 4 | 0.54 | good | smooth | 4 | 63 | 4 | 1.29 |
| HMPEG 1 | 0.30 | good | smooth | 4 | 62 | 4 | 3.4 |

Example 5

In this example it is shown that the selected materials HMHEC 4 and HMPEG 1 demonstrate good performance in coatings for wood. In Table 8 and Table 9 formulations are given of a parquet lacquer based on a urethane-acrylic dispersion (Table 8) and of a universal wood coating based on a combination of acrylic latexes (Table 9). The paint properties obtained with the different thickeners are then summarized in Table 10 and 11.

TABLE 8

Formulation of a parquet lacquer.

|  | Parts by weight |
|---|---|
| Urethane-acrylic dispersion | 88.0 |
| Ethyldiglycol | 4.0 |
| Defoamer | 0.4 |
| Thickener | variable to 40 DIN 4 |
| Wax emulsion | 5.0 |
| Defoamer | 0.8 |
| Wetting agent | 0.5 |
|  | 100.0 |

The solids content of this formulation is 34 wt %.

The particle size is approximately 100 nm.

TABLE 9

Formulation of a universal wood coating.

|  | Parts by weight |
|---|---|
| Acrylic latex 1 | 72.0 |
| Acrylic latex 2 | 8.0 |
| Wax emulsion | 5.0 |
| Diethyleneglycolmonoethylether | 10.0 |
| Defoamer | 1.0 |
| Matting agent | 1.0 |
| Thickener + water | variable to 40 s DIN 4 |
| Defoamer | 2.0 |
| Ammonia (25%) | to pH ~ 8.2 |
|  | 100.0 |

The solids content of this formulation is 38 wt %.

The particle size is approximately 100 nm.

The acrylic latex 1 and the acrylic latex 2 are as discussed in the description.

TABLE 10

Paint properties of the parquet lacquer (Table 8) using different rheology modifiers.

|  | Conc. [wt %] for 40s | Flow | Film appear. | Gloss 20 (%) | Stain resist. | Hot pan test | $C^*_p$ |
|---|---|---|---|---|---|---|---|
| Plus 331 | 0.74 | poor | moderate | 55 | moderate | poor | 0.30 |
| HMHEC 2 | 0.74 | moderate | good | 60 | good | moderate | 0.71 |
| HMHEC 4 | 0.76 | good | good | 64 | good | good | 1.29 |
| HMPEG 1 | 0.30 | good | good | 62 | good | moderate | 3.4 |

HMHEC 4 and HMPEG 1 provide the coating again with good film properties (high gloss and smooth films) and the flow of these products is good. The moderate rating with HMPEG 1 in the hot pan test is not due to flocculation as can be seen from its good gloss value. It is more a result of its low softening temperature (~45 C).

TABLE 11

Paint properties of the universal wood coating using the different thickeners.

|  | Conc. [wt %] for 40s | Sprayability | Film appear. | Gloss 60 (%) | Stain resist. | Hot pan test | $C^*_p$ |
|---|---|---|---|---|---|---|---|
| Plus 331 | 0.18 | poor | moderate | 21 | moderate | poor | 0.30 |
| HMHEC 2 | 0.21 | moderate | moderate | 25 | good | moderate | 0.71 |
| HMHEC 4 | 0.26 | good | good | 25 | good | good | 1.29 |
| HMPEG 1 | 0.61 | good | good | 25 | good | moderate | 3.4 |

Example 6

In example 6 a number of coating formulations are given using HMHEC 4 or HMPEG 1 as a rheology modifier.

TABLE 12

Formulation of airless sprayable pigmented top coat.

|  | Parts by weight |
|---|---|
| Propyleneglycol | 22.0 |
| Water | 25.0 |
| 2-amino-2-methyl-1-propanol | 3.0 |
| Defoamer | 5.0 |
| Wetting agent | 4.0 |
| Dispersant | 3.0 |
| $TiO_2$ | 152.0 |
| $CaCO_3$ | 51.0 |
| Acrylic core shell latex | 666.0 |
| Coalescing agent | 6.0 |
| Defoamer | 22.0 |
| Water + thickener | 14.0 |
| (HMHEC 4: 2.5 parts or HMPEG 1: 1.0 parts) |  |
| Total | 1000.0 |

TABLE 13

Formulation of a metal primer based on an epoxyester emulsion.

|  | Parts by weight |
|---|---|
| Water | 409.5 |
| Dispersant | 87.0 |
| Defoamer | 1.5 |
| $TiO_2$ | 345.0 |
| $CaCO_3$ | 174.0 |
| Talc | 130.5 |
| Anti-corrosion pigment | 217.5 |
| Epoxyester emulsion | 1440.0 |
| Siccatol 938 | 36.0 |
| Wetting agent | 7.5 |
| Thickener + water | 151.5 |
| (HMHEC 4: 9.6 parts or HMPEG 1: 5.8 parts per 1000 parts of paint) |  |
|  | 3000.0 |

What is claimed:

1. A process of using an aqueous protective coating composition containing a binder system and an associative thickener for industrial coatings comprising applying said protective coating to a substrate characterized in that the associative thickener is not a polyurethane thickener and is selected so that its concentration required by the specific application method is below the critical concentration C*, defined as the thickener concentration at which the coils of the thickener polymer start to overlap or entangle, calculated according to the Mark Houwink equation $$C^* = \frac{2.5}{[\eta]}$$

$$\alpha * \langle h^2 \rangle_h^{3/2} = [\eta] * M_v = K * M_v^{\alpha+1}$$

$$R_G = \left(\frac{\langle h^2 \rangle_h}{6}\right)^{1/2}$$

wherein
- $[\eta]$ is the limiting viscosity number,
- $\Phi$ and K are proportionality constants,
- $<h^2>h$ is the hydrodynamic equivalent mean square end to end distance of the polymer molecule,
- $M_v$ is the viscosity average molecular weight of the thickener,
- $\alpha$ is a constant, and
- $R_G$ is the radius of gyration.

2. The process according to claim 1, wherein the concentration of the thickener is below $C^*/2.5 = 1/[\eta]$.

3. The process according to claim 1, wherein the binder system of the coating composition has particle sizes of about 200 nm or less.

4. The process according to claim 3, wherein the binder system of the coating composition has particle sizes of about 100 nm or less.

5. The process according to claim 4, wherein the binder system of the coating composition has particle sizes of about 50 nm or above.

6. The process according to claim 1, wherein the associative thickener is a carbohydrate based thickener.

7. The process according to claim 6, wherein the carbohydrate based thickener is a cellulose based thickener.

8. The process according to claim 1, wherein the associative thickener is a synthetic thickener.

9. The process according to claim 1, wherein the hydrophobe content of the thickener is 0.5 wt % to 4 wt %.

10. The process according to any of claims 1 to 9, wherein the basic polymer of the associative thickener is hydroxyethyl cellulose, hydroxypropyl cellulose, methyl cellulose, polyethyleneoxide, ethylhydroxyethyl cellulose, carboxymethyl cellulose, guar gum, starch, starch ethers, locust bean gum, pectin, xanthan gum, methylhydroxyethyl cellulose, polyvinylpyrolidone, polyvinyl alcohol, methylhydroxypropyl cellulose, mixed ethers of the above cellulose derivatives and mixtures thereof.

11. The process according to claim 10, wherein the starch ether is hydroxyethyl starch.

12. The process according to claim 10, wherein the industrial coating is applied by conventional air spray techniques, high volume low pressure (HVLP) techniques or airless spray techniques.

13. The process according to claim 12, wherein the industrial coating is a coating for protection of transport vehicles, referred to as Transport Original Equipment Manufacturing, car refinish, anti-corrosion coating, maintenance coating or wood coating.

14. An aqueous protective coating composition having a viscosity which allows its application by industrial methods, containing an associative thickener and a binder system, wherein the binder system has a particle size of 50 nm to 200 nm, characterized in that the associative thickener is not a polyurethane thickener and is present in a concentration which is below the critical concentration C*, defined as the thickener concentration at which the coils of the thickener polymer start to overlap or entangle, calculated according to the Mark Houwink equation $$C^* = \frac{2.5}{[\eta]}$$

$$\alpha * \langle h^2 \rangle_h^{3/2} = [\eta] * M_v = K * M_v^{\alpha+1}$$

$$R_G = \left(\frac{\langle h^2 \rangle_h}{6}\right)^{1/2}$$

wherein
- $[\eta]$ is the limiting viscosity number,
- $\Phi$ and K are proportionality constants,
- $<h^2>h$ is the hydrodynamic equivalent mean square end to end distance of the polymer molecule,
- $M_v$ is the viscosity average molecular weight of the thickener,
- $\alpha$ is a constant, and
- $R_G$ is the radius of gyration.

15. The aqueous protective coating composition according to claim 14, wherein the concentration of the thickener is below $C^*/2.5 = 1/[\eta]$.

16. The aqueous protective coating composition according to claim 14, wherein the binder system of the coating composition has particle sizes of about 100 nm or less.

17. The aqueous protective coating composition according to claim 14 wherein the associative thickener is a carbohydrate based thickener.

18. The aqueous protective coating composition according to claim 17, wherein the carbohydrate based thickener is a cellulose based thickener.

19. The aqueous protective coating composition according to claim 14, wherein the associative thickener is a synthetic thickener.

20. The aqueous protective coating composition according to claim 14, wherein the hydrophobe content of the thickener is 0.5 wt % to 4 wt %.

21. The aqueous protective coating composition according to any of claims 14 to 19, wherein the basic polymer of the associative thickener is hydroxyethyl cellulose, hydroxypropyl cellulose, methyl cellulose, polyethyleneoxide, ethylhydroxyethyl cellulose, carboxymethyl cellulose, guar gum, starch, starch ethers, locust bean gum, pectin, xanthan gum, methylhydroxyethyl cellulose, polyvinylpyrolidone, polyvinyl alcohol, methylhydroxypropyl cellulose, mixed ethers of the above cellulose derivatives and mixtures thereof.

22. The aqueous protective coating composition according to claim 21, wherein the starch ether is hydroxyethyl starch.

* * * * *